United States Patent
Duffell

[19]

[11] Patent Number: 6,053,679
[45] Date of Patent: Apr. 25, 2000

[54] CARRIAGE FOR EXPANDABLE DOOR

[76] Inventor: Joseph D. Duffell, P.O. Box 3186, Hutchinson, Kans. 67504-3186

[21] Appl. No.: 09/113,202

[22] Filed: Jul. 10, 1998

[51] Int. Cl.[7] ..................................................... B60P 7/14
[52] U.S. Cl. ..................... 410/125; 410/126; 410/127; 410/128; 410/130; 410/132; 410/139
[58] Field of Search .................................. 410/125–130, 410/132–134, 138, 139, 142, 144, 145, 150; 220/534, 542, 546, 550; 296/37.6; 52/64, 243.1

[56] References Cited

U.S. PATENT DOCUMENTS

| Re. 27,615 | 4/1973 | Brown, Jr. et al. | 410/125 |
|---|---|---|---|
| 3,191,546 | 6/1965 | Adler | 410/137 |
| 3,718,099 | 2/1973 | Thornton et al. | 410/125 |
| 3,791,310 | 2/1974 | Loomis et al. | 410/125 |
| 3,791,311 | 2/1974 | Loomis | 410/125 |
| 3,808,982 | 5/1974 | Bertram et al. | 410/125 |
| 3,915,096 | 10/1975 | Salisbury | 410/125 |
| 5,329,858 | 7/1994 | Morris et al. | 410/130 X |
| 5,788,439 | 8/1998 | Duffell | 410/138 |

FOREIGN PATENT DOCUMENTS

| 1158600 | 6/1958 | France | 220/550 |
|---|---|---|---|

*Primary Examiner*—Stephen T. Gordon
*Attorney, Agent, or Firm*—Kenneth Jack; Davis & Jack, LLC

[57] ABSTRACT

A carriage for rollable suspension of a bulkhead door from a pair of overhead roller tracks, the bulkhead door having an extendable and retractable lading-engaging panel attached thereto, the carriage consisting of a bulkhead door suspension beam; a lading-engaging panel suspension beam; a first pair of rollers; a second pair of roller tracks; the second pair of roller tracks interconnecting the bulkhead door suspension beam and the lading-engaging panel suspension beam so that the lading-engaging panel suspension beam may alternately extend from and retract toward the bulkhead door suspension beam; and left and right pairs of wheels fixedly and rotatably attached to the bulkhead door suspension beam, the left and right pairs of wheels allowing, upon placement of their rolling surfaces in rolling contact with the pair of overhead roller tracks, rolling motion, in unison, of the bulkhead door suspension beam, the lading-engaging panel suspension beam, the first pair of rollers, and the second pair of roller tracks.

21 Claims, 5 Drawing Sheets

CARRIAGE FOR EXPANDABLE DOOR

FIELD OF THE INVENTION

This invention relates to carriages for rolling overhead suspension of cargo space partitions, including railcar bulkhead doors. More particularly, this invention relates to such carriages utilizable for rolling suspension of bulkhead doors having extendable and retractable cargo engaging or lading-engaging panels affixed thereto.

BACKGROUND OF THE INVENTION

The interior spaces of railroad boxcars commonly are adjustably partitioned by heavy steel bulkhead doors which are rollably suspended from overhead roller tracks. Such roller tracks typically are welded to steel structural members at or near the upper ends of the side walls of a railcar, providing a pair of rolling surfaces extending longitudinally along the full length of the railcar. Rolling suspension of such bulkhead doors is typically provided by carriages having wheels positioned in rolling contact with the upper surfaces of the roller tracks, the carriage spanning the lateral width of the railcar. Commonly, such bulkhead doors have attached thereto a longitudinally extendable and retractable lading-engaging panel, such panel typically being pneumatically actuated through injection of pressurized air into an air bladder, such bladder being interposed between the lading-engaging panel and the bulkhead door. Injection of pressurized air into such an air bladder thrusts the lading-engaging panel away from the bulkhead door, moving the panel along a line parallel to the longitudinal axis of the railcar. Such motion presses the outer surface of the lading-engaging panel against cargo, preventing the cargo from shifting and moving during transportation. Common bulkhead door suspension carriages, such as cog wheel carriages (which are known to be adapted for rolling suspension of bulkhead doors and bulkhead door/lading-engaging panel assemblies) are often difficultly moveable, and often become misaligned and jammed. Also, frictional contact between cogs protruding from the wheels of a cog wheel carriage and cog wheel receiving apertures within overhead roller tracks, causes both the cog wheels and the roller tracks to prematurely wear out. The instant inventive door carriage provides smooth rolling motion of a suspended bulkhead door/lading-engaging panel assembly along the roller tracks of a railcar, and also provides for smooth rolling motion of the lading-engaging panel with respect to the bulkhead door. The instant inventive carriage also prevents jamming and reduces frictional wear. Such smooth rolling motion and prevention of jamming and frictional wear is provided by a rolling frame adapted for rolling suspension of a bulkhead door/lading-engaging panel assembly, the frame including roller tracks for suspension and separate rolling motion of the lading-engaging panel with respect to the bulkhead doors.

PRIOR ART PATENTS

U.S. Pat. No. 5,386,674 issued Feb. 7, 1995, to Sfirakis, et al., discloses a roller carriage for suspending a railcar bulkhead door.

U.S. Pat. No. 3,808,982 issued May 7, 1974, to Bertram, et al., discloses a cogwheel roller carriage for suspending lading-engaging expandable bulkhead doors.

U.S. Pat. No. 3,804,027 issued Apr. 16, 1974, to Chapman discloses pneumatically expandable lading-engaging panels rollably mounted upon castors.

U.S. Pat. No. 3,427,997 issued Feb. 18, 1969, and U.S. Pat. No. RE.27,615 issued Apr. 17, 1973, to Brown, Jr., et al., discloses cogwheel carriages for rollable suspension of a bulkhead door having pneumatically expandable lading-engaging panels.

U.S. Pat. No. 3,131,684 issued May 5, 1964, to Seger discloses air cushioned lading-engaging panels rollably suspended by rollers from roller tracks.

U.S. Pat. No. 2,856,867 issued Oct. 21, 1958, to Daisey discloses air cushioned lading-engaging panels rollably suspended upon roller tracks.

U.S. Pat. No. 4,057,066 issued Nov. 1, 1977, to Homanick discloses a ceiling mounted spring cushioned cargo restraint system.

U.S. Pat. No. 4,639,031 issued Jan. 27, 1987, to Truckenbrodt discloses a roller carriage for suspension of a moveable thermal barrier within an insulated truck trailer.

None of the above disclosed patents teach, disclose or describe the novel, inventive, useful and unique aspects, elements and features of the present inventive carriage for expandable door.

BRIEF SUMMARY OF THE INVENTION

The present inventive carriage for an expandable door preferably comprises a fixed "C" channel beam having a right end, a left end, a forward side wall, a rearward side wall, and having a downwardly opening channel. The forward and rearward side walls of the fixed "C" channel beam preferably have bolt receiving apertures therethrough, preferably six apertures to each side; such apertures being positioned in groups of three, in close linear sequences near the ends of the side walls of the fixed "C" channel beam.

The bolt receiving apertures are preferably positioned and situated so that they overlie the outer surfaces of the side walls of a pair of smaller "C" channel extension arm beams which slidably nest within the channel of the fixed "C" channel beam. Preferably, the side walls of the smaller extension arm "C" channel beams have slotted apertures therethrough, the slotted apertures being positioned so that spirally threaded bolts extending through the bolt receiving apertures within the side walls of the fixed "C" channel beam may further extend through the slotted apertures. Upon such extension of such bolts, spirally threaded nuts may be threadedly mounted over the bolts, the nuts being positioned within the channels of the extension arm beams. Upon tightening of such nuts, the extension arm "C" channel beams are fixed in place. Upon loosening of such nuts, the extension arm "C" channel beams may be slidably longitudinally moved along the channel of the fixed "C" channel beam. Preferably, the lengths of the extension arm "C" channel beams are fitted so that upon such sliding motion, their outer ends may alternately extend outwardly from and retract toward the ends of the fixed "C" channel beam. Thus, through selective loosening and tightening of the bolts and nuts and through slidable positioning of the extension arm "C" channel beams, the effective length of the fixed "C" channel beam may be lengthened or shortened. In an alternate acceptable configuration of the fixed "C" channel beam/extension arm assembly, only one of its ends has an extension arm beam slidably mounted thereon. Utilization of both left and right extension arms is preferable because economies are gained through similarly configuring the ends of the fixed "C" channel beam.

A right angle iron is preferably fixedly welded to the right end of the right extension arm "C" channel beam in a "T" configuration wherein the ends of such angle iron extend perpendicularly forwardly and rearwardly therefrom. Preferably, the right angle iron is oriented so that one of its flanges extends horizontally and leftwardly, and so that its other flange extends vertically upward. Preferably, the outer edges of the right extension arm "C" channel beam are welded to the inwardly facing surface of the vertical flange of the right angle iron, and preferably that portion of the lower surfaces of the side walls of the extension arm "C" channel beam which overlies the horizontal flange of the right angle iron is similarly welded. Upon such attachment of the right angle iron to the right end of the right extension arm "C" channel beam, the right angle iron becomes adjustably extendable and retractable, through slidable adjustment of the right extension arm "C" channel beam. A left angle iron is preferably fixedly welded to the left end of the left extension arm "C" channel beam, the left angle iron being configured and affixed as a mirror image of the right angle iron. Upon such attachments of the left and right angle irons to the left and right ends of the left and right extension arm "C" channel beams, the upwardly facing surfaces of their horizontal flanges form laterally adjustable parallel roller tracks, such tracks facilitating rollable motion of a moveable "C" channel beam with respect to the fixed "C" channel beam.

The moveable "C" channel beam is preferably configured substantially identically with configuration of the fixed "C" channel beam; the moveable "C" channel beam similarly having left and right extension arm "C" channel beams slidably and adjustably mounted within the interior space of its downwardly opening channel. A pair of flanged wheels, preferably having sealed internal roller bearings are preferably rotatably mounted upon the outer ends of the left and right extension arm "C" channel beams of the moveable "C" channel beam, such flanged wheels being positioned so that their axes of rotation are parallel to the longitudinal axis of the moveable "C" channel beam. Through slidable positioning of the adjustment arm "C" channel beams mounted within the channel of the moveable "C" channel beam, the rolling surfaces of the moveable "C" channel beam's flanged wheels may be laterally positioned so that they maintain rolling contact with the upper surfaces of the horizontal flanges of the left and right angle irons. Like the fixed "C" channel beam, adjustability of the effective length of the moveable "C" channel beam may alternately provided through utilization of a single extension arm "C" channel beam. However, like the fixed "C" channel beam, it is preferable that the moveable "C" channel beam have extension arm "C" channel beams installed at both of its ends.

Four additional sealed bearing flanged wheels are preferably rotatably mounted upon the left and right angle irons, such four wheels being positioned and aligned so that their axes of rotation are parallel with the longitudinal axis of the fixed "C" channel beam, so that they extend outwardly from the outwardly facing surfaces of the vertical flanges of the left and right angle irons, and so that they are respectively positioned at the four corners of the carriage frame; i.e., at the forward and rearward ends of the left and right angle irons. Such positioning of the four wheels allows the entire carriage to be placed upon the overhead roller tracks of a railroad railcar for rolling motion of the carriage along the length of the railcar.

Commonly, the lateral distance between overhead tracks of railcars varies slightly from railcar to railcar. Adjustment of the positioning of the extension arm "C" channel beams of the fixed "C" channel beam and of the moveable "C" channel beam insures that the rolling surfaces of all of the flanged wheels of the carriage remain in proper rolling contact with their respective roller tracks.

For stability on overhead roller tracks, the forward ends of the left and right angle irons preferably extend forwardly between twelve and eighteen inches beyond the forward wall of the fixed "C" channel beam. The rearward ends of the left and right angle irons similarly extend rearwardly from the rearward wall of the fixed "C" channel beam, such rearward extension necessarily being sufficient to create roller tracks long enough to allow pneumatic extension of a lading-engaging panel suspended from the moveable "C" channel beam.

Preferably, the rearward ends of the left and right angle irons are reinforced by a reinforcement bar spanning therebetween. The ends of such reinforcement bar are preferably spirally threaded and extend through reinforcement bar receiving apertures passing through the rearward ends of the vertical flanges of the left and right angle irons. Two pairs of threaded nuts are preferably tightened over the ends of such reinforcement bar and against the inner and outer surfaces of such vertical flanges of the left and right angle irons; thereby fixedly holding the reinforcement bar in place, and allowing adjustable lengthening and shortening of the effective length of the reinforcement bar to match the effective length of the fixed "C" channel beam.

Preferably, the moveable "C" channel beam has a pair of eye plates which extend downwardly from its lower surface for engagement with device joints which commonly upwardly extend from lading-engaging panels. Also preferably, "keeper" bars are welded to the forward and rearward ends of the lower surfaces of the left and right angle irons, the keepers being positioned so that they extend outwardly to underlie the overhead roller tracks of a railcar, preventing the door carriage from bouncing upward from such tracks.

In operation, the present inventive expandable door carriage is rollably mounted upon the overhead roller tracks of a railcar so that the carriage freely rolls along the longitudinal length of the railcar. The bulkhead door of a bulkhead door/lading-engaging panel assembly is then fixedly attached to the fixed "C" channel beam, preferably through welded attachment plates, such attachment causing the bulkhead door to extend downwardly from the fixed "C" channel beam. The lading-engaging panel of such assembly is similarly attached to the moveable "C" channel beam; preferably through insertion of shear pins through device joints extending upwardly from the upper end of the lading-engaging panel, the shear pins also extending through the eye plates which extend downwardly from the moveable "C" channel beam. The carriage and attached bulkhead door/lading-engaging panel assembly may then be rollably moved along the longitudinal length of the railcar to a desired positioned. At the desired positioned, the bulkhead door is locked in place, typically through utilization of upwardly and downwardly extending lock pins which are commonly incorporated into such bulkhead doors. With the bulkhead door/lading-engaging panel assembly locked in place, cargo is loaded into the railcar at the lading-engaging panel side of the assembly. Upon completion of loading, an air compressor is typically utilized to inject air into an air bladder disposed between the bulkhead door and the lading-engaging panel, causing the lading-engaging panel to extend outwardly from the bulkhead door, rolling along the roller tracks of the carriage, and pressing upon the cargo. Pressure exerted by the lading-engaging panel upon the cargo holds the cargo in place during transportation.

The rolling interfaces between the overhead roller tracks, the carriage roller tracks, and the rollers of the carriage, provide for smooth, low friction rolling motions of the carriage with respect to the railcar, and of the lading-engaging panel with respect to the bulkhead door. Such smooth, rolling motion allows easy, manually induced, movement of the bulkhead door/lading-engaging panel assembly, prevents carriage jamming, and prevents premature wear of roller tracks and rollers.

Accordingly, it is an object of the present inventive carriage for expandable door to provide a carriage capable of rollable suspension of a bulkhead door/lading-engaging panel assembly.

It is further object of the present invention to provide such a carriage which is capable of rollable motion upon overhead roller tracks, the carriage further providing for rollable motion of a subcarriage within the carriage.

It is a further object of the present invention to provide such a carriage which resists jamming and misalignment upon the overhead roller tracks.

It is a further object of the present invention to provide such a carriage which allows smooth, manually induced, rolling motion of a bulkhead door/lading-engaging panel assembly suspended therefrom.

It is a further object of the present invention to provide such a carriage which prevents premature frictional wear of the rolling surfaces of its wheels and roller tracks.

Other and further objects, benefits, and advantages of the present inventive carriage for expandable door will become known to those skilled in the art upon review of the appended drawings, and upon review of the Detailed Description which follows.

BRIEF DESCRIPTION OF THE DRAWINGS

Drawing

Drawing

Drawing

Drawing

Drawing

DETAILED DESCRIPTION OF THE PREFERRED EMBODIMENT

Figure 1:
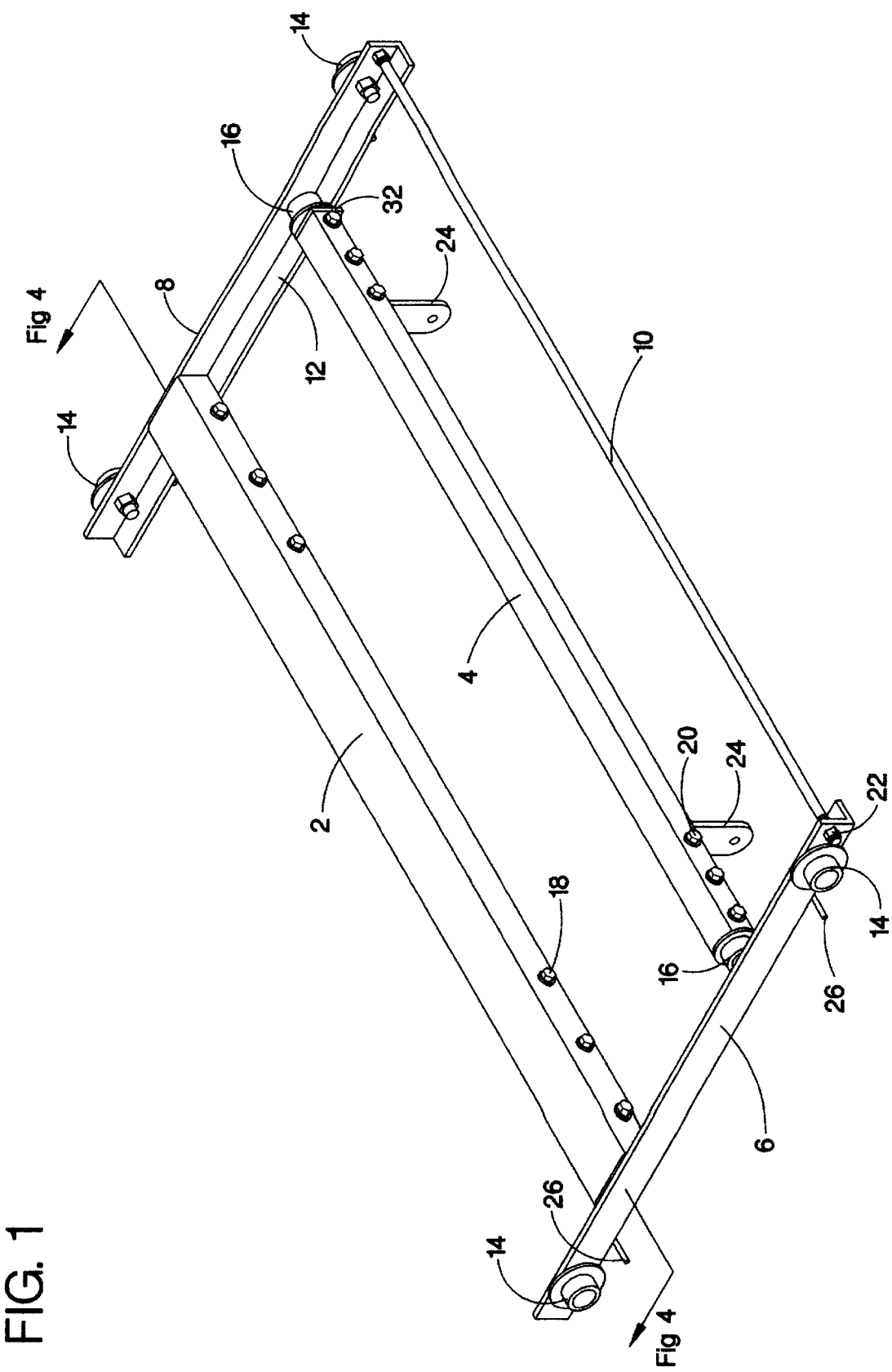
FIG. 1 is an isometric view a preferred embodiment of the present inventive carriage for an expandable door.
Figure 4:
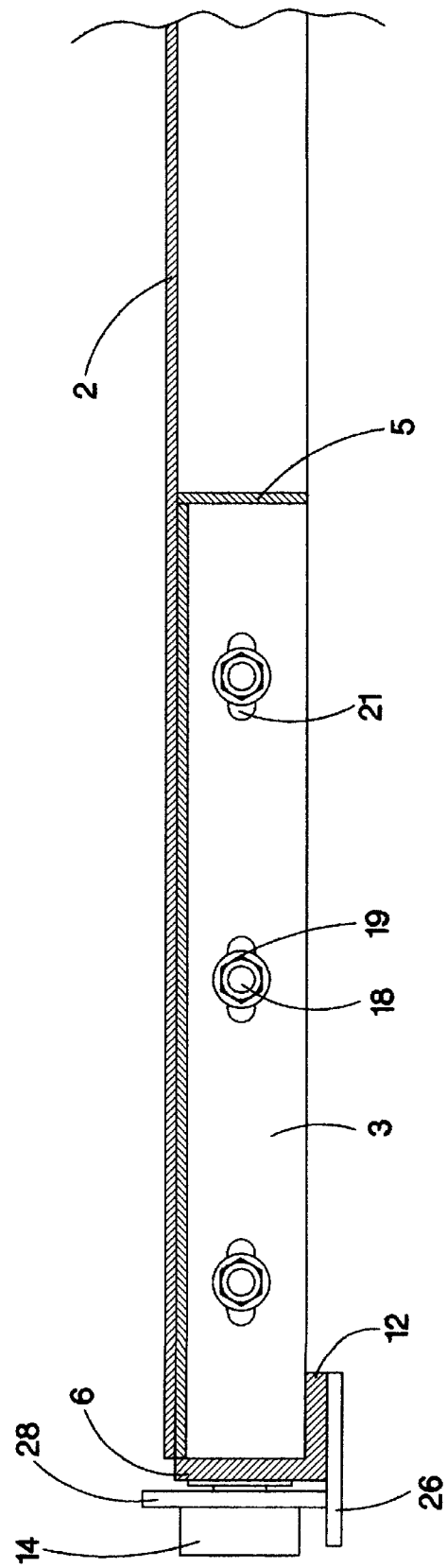
FIG. 4 is a sectional view of FIG. 1, as indicated on FIG. 1.
Figure 5:
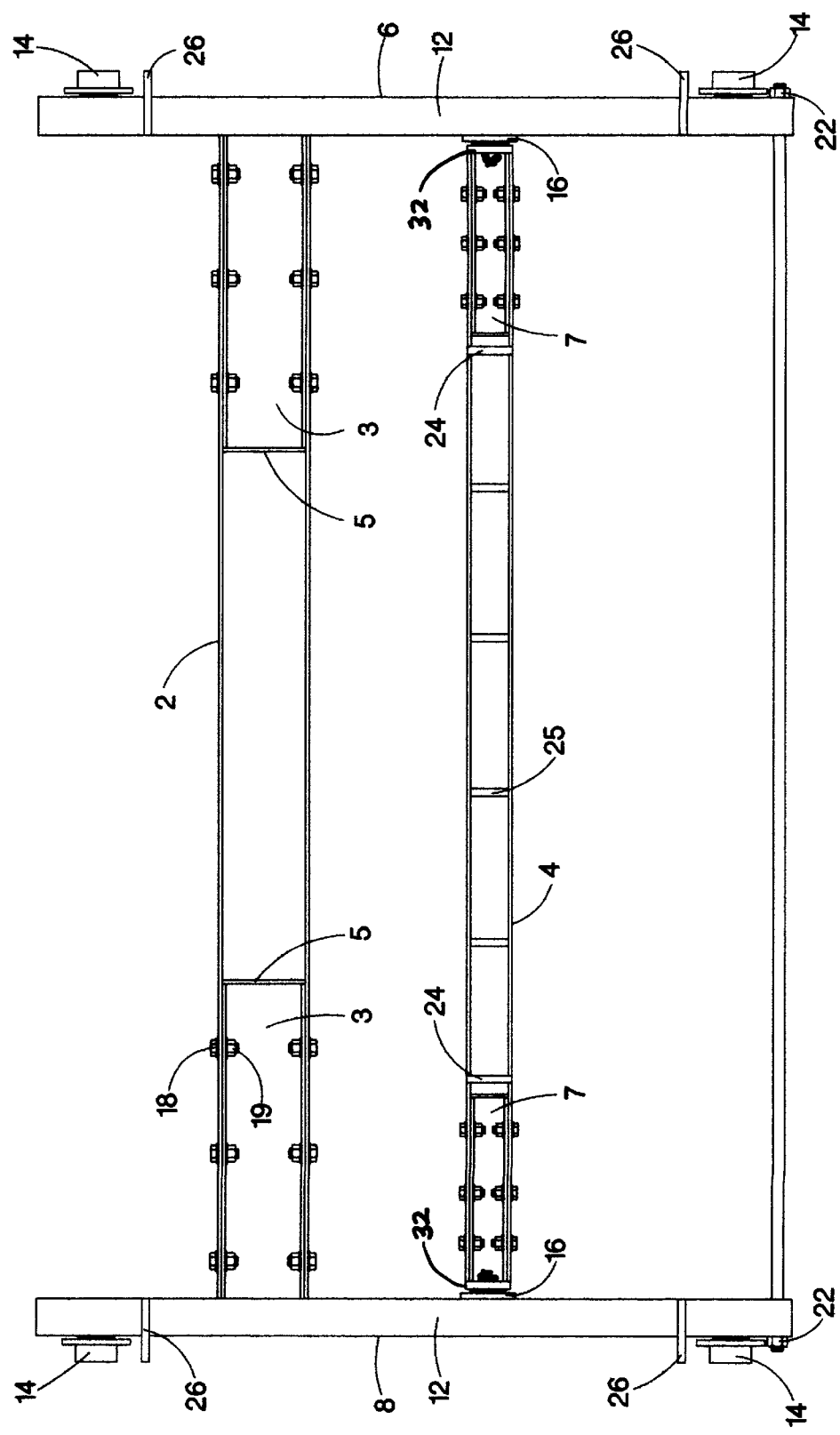
FIG. 5 is a plan view of the undersurface of the carriage depicted in FIG. 1.

Referring now to the drawings, and in particular to Drawing FIG. 1, a first major structural element of the present inventive carriage for an expandable door is a bulkhead door suspension beam 2. The bulkhead door suspension beam 2, as depicted, is preferably a "C" channel beam oriented so that its channel opens downwardly. Other types of structural beams may be utilized for the bulkhead door suspension beam, such as an "I" beam, or rectangular or square steel tubing. However, the "C" channel configuration is preferable because it has a shorter vertical profile than an "I" beam, and because its open channel allows easy access to, referring to FIG. 5, extension arms 3, which themselves are preferably shorter segments of "C" channel beams which slidably nest within the channel of the bulkhead door suspension beam 2. When hexagonal nuts 19, which are threadedly mounted over hexagonal headed bolts 18, are loosened, the extension arms 3 become slidably moveable longitudinally within the channel of the bulkhead door suspension beam 2. Such motion allows the ends of the extension arms 3 to be adjustably extended outwardly from or adjustably retracted inwardly toward the ends of the bulkhead door suspension beam 2. Referring to FIG. 4, such longitudinal sliding motion of the extension arms 3 is restricted to the longitudinal length of slide slots 21 through which the bolts 18 pass. Referring simultaneously to FIGS. 4 and 5, the inwardly facing ends of the extension arms 3 preferably have reinforcing end plates 5 welded thereto.

Numerous other means providing extendability and retractability of the bulkhead door suspension beam 2 may alternately be utilized. For example, the bulkhead door suspension beam may be configured so that it slidably nests within the channels of a pair of larger gauge "C" channel extension arms. Alternately, a single extension arm may be utilized. However, the configuration depicted in FIGS. 1, 4 and 5 is preferred.

Referring simultaneously to FIGS. 1 and 5, the extendable and retractable extension arms 3 allow the overall effective length of the bulkhead door suspension beam 2 to be selectively lengthened or shortened. Referring to Drawing FIG. 3, overhead roller tracks 36 are commonly installed at the upper ends of the side walls of rail boxcars. Selective lengthening and shortening of the length of the bulkhead door suspension beam 2 compensates for varying distances between such overhead roller tracks 36, allowing the carriage to be installable in a large number of railcars, rather than being permanently custom fitted for use in a single railcar.

Referring again to Drawing FIG. 1, a second major structural element of the present inventive carriage is a lading-engaging panel suspension beam 4. The lading-engaging panel suspension beam 4, as depicted, is preferably a "C" channel beam oriented so that its channel opens downwardly. Other types of structural beams may be utilized for the lading-engaging panel suspension beam, such as an "I" beam, or rectangular or square tubing. However, the "C" channel configuration of the lading-engaging panel suspension beam 4 is preferable because its open channel allows easy access to, referring to FIG. 5, extension arms 7, which themselves are preferably shorter segments of "C" channel beams, such segments slidably nesting within the channel of the lading-engaging panel suspension beam 4. Referring simultaneously to FIGS. 1 and 5, upon loosening of hexagonal bolts 20, the extension arms 7 become slidably moveable longitudinally within the channel of the lading-engaging panel suspension beam 4, allowing the ends of the extension arms 7 to be adjustably extended outwardly from or retracted toward the ends of the lading-engaging panel suspension beam 4. Like the motion of the extension arms 3 of the bulkhead door suspension beam 2, slidable motion of the extension arms 7 is restricted to the longitudinal length of bolt receiving slots extending through such arms' side walls.

Like the bulkhead door suspension beam 2, numerous other means for extendability and retractability of the lading-engaging panel suspension beam 4 may be utilized. However, the configuration depicted in FIGS. 1 and 5 is preferred. Referring to FIGS. 1 and 5, extension arm end plates 32 are preferably welded to the outwardly facing ends of each extension arm 7, the extension arm end plates 32 having rotatably mounted thereon flanged sealed bearing wheels 16. A pair of eye plates 24 are preferably welded to, and extend downwardly from, the lower surface of the lading-engaging panel suspension beam 4. Also preferably, the lading-engaging panel suspension beam 4 is structurally reinforced by reinforcement plates 25 welded in place within such beam's channel.

Referring to FIG. 1, means for rollably mounting the lading-engaging panel suspension beam 4 so that it may alternately be extended from and retracted toward the bulkhead door suspension beam 2 is provided, such means preferably being the flanged wheels 16 of the lading-engaging panel suspension beam 4, a left angle iron 6, and a right angle iron 8. Referring simultaneously to FIGS. 1 and 4, the inwardly facing surfaces of the vertical flanges of the left and right angle irons 6 and 8 are preferably fixedly welded to the outwardly facing ends of the extension arms 3 of the bulkhead door suspension beam 2. Those portions of the lower surfaces of the extension arms 3 which overlap the horizontal flanges 12 of the left and right angle irons 6 and 8 are also preferably welded in place. As the extension arms 3 are adjustably extended or retracted, the left and right angle irons 6 and 8 also adjustably extend or retract, causing the overall width of the carriage to be adjustably lengthened or shortened. The upper surfaces of the horizontal flanges 12 of the left and right angle irons 6 and 8, provide roller tracks, facilitating rollable motion there along of the flanged wheels 16 of the lading-engaging panel suspension beam 4. Numerous other rollable mounting means providing for alternate extension and retraction of the lading-engaging panel suspension beam 4 may be utilized. For example, ball bearings which rollably move along linear ball bearing races may be substituted for the flanged wheels 16 and the roller tracks of the left angle iron 6 and right angle iron 8. As another example, differently configured oblongated structural members having a linear rolling surface may be extended from the ends of the bulkhead door suspension beam 2, or extended from other positions along the length of the bulkhead door suspension beam 2. However, the means depicted in FIG. 1 is preferred for its simplicity in construction, space, economy, and cost economy.

Figure 3:
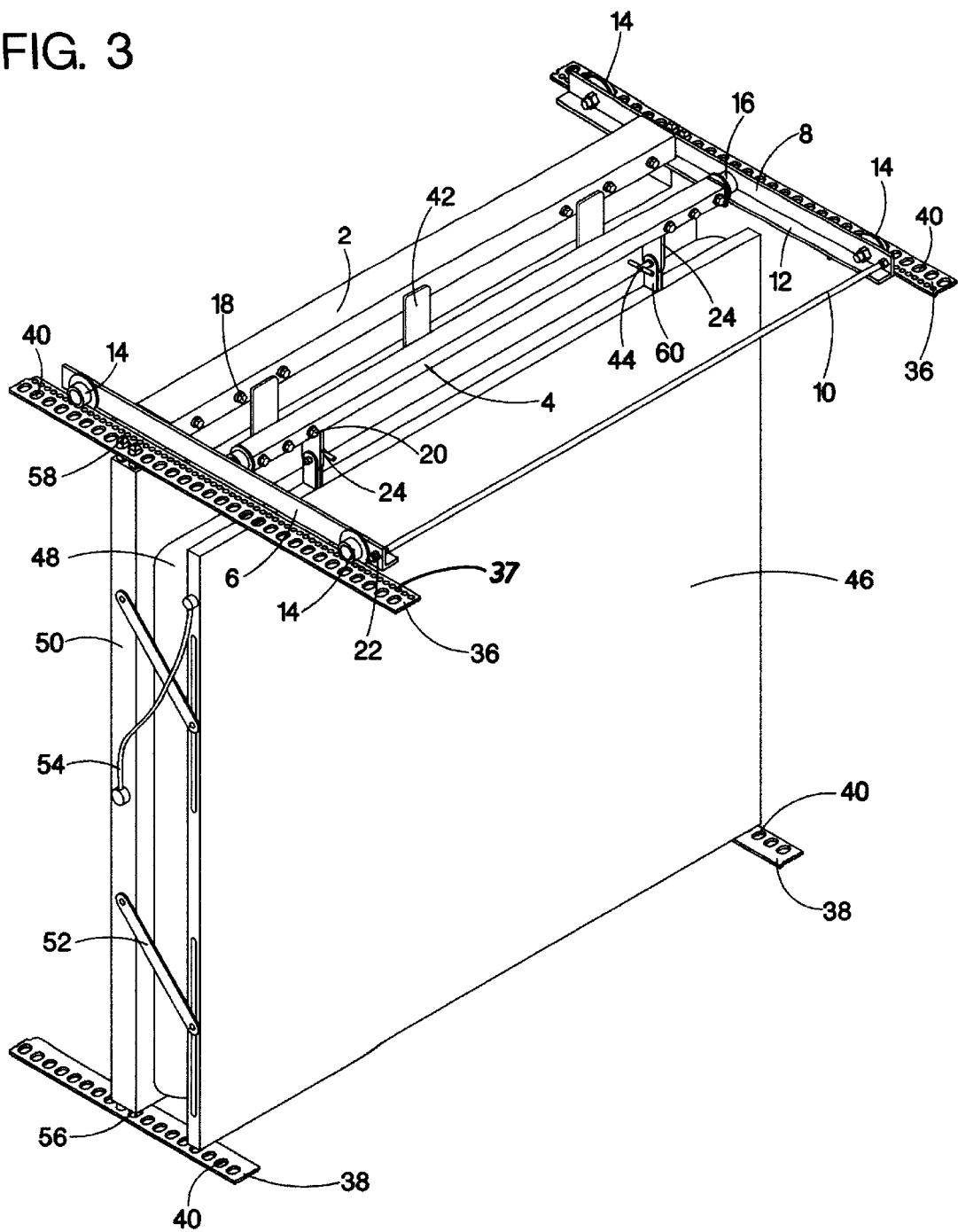
FIG. 3 depicts the carriage depicted in FIG. 1, the view showing a bulkhead door suspended therefrom, showing a lading-engaging panel suspended therefrom, and showing the carriage rollably mounted upon overhead roller tracks.

Referring to FIG. 3, rollable mounting means for rollably suspending the carriage from overhead tracks 36 is also provided, such means preferably being flanged wheels 14 which roll along the upper rolling surfaces of the overhead roller tracks 36. Like the rollable mounting means for the lading-engaging panel suspension beam, numerous other rollable mounting means may be provided for rollably suspending the carriage from the roller tracks 36. However, the flanged wheels 14 mounted as depicted in FIG. 3 are preferred because of simplicity of construction and cost economy.

Figure 2:
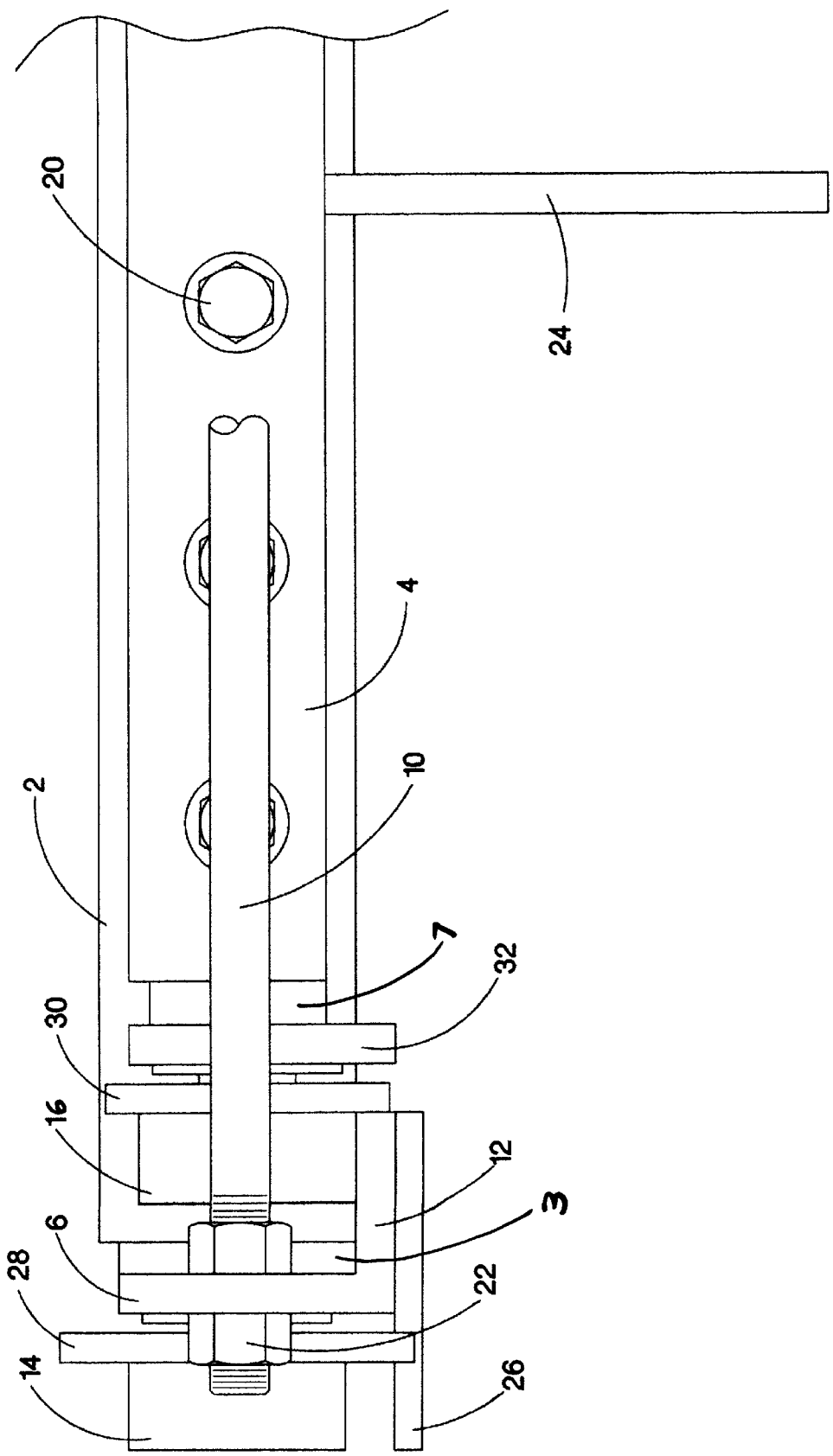
FIG. 2 is an elevational magnified view of the left end of the carriage depicted in FIG. 1.

Referring simultaneously to FIGS. 2 and 3, each of the flanged wheels 14 and 16 of the carriage have an annular track retaining flange 28 and 30, each such flange having an outwardly facing surface. As wheels 14 and 16 roll along their respective tracks, the outwardly facing surfaces of the annular flanges 28 and 30 engage the inwardly facing surfaces of the roller tracks 36 and 12, keeping the wheels 14 and 16 in proper rolling position along the upper surfaces of such tracks.

Referring simultaneously to FIGS. 1 and 2, a reinforcement bar 10 spans between the left angle iron 6 and the right angle iron 8, providing additional structural rigidity. Spirally threaded ends of the reinforcement bar 10 pass through apertures within the vertical flanges of the left and right angle iron 6 and 8. Spirally threaded nuts 22 threadedly mounted over the ends of the reinforcement bar 10 at either side of said vertical flanges provide for adjustability of the effective length of the reinforcement bar 10; allowing the length of the reinforcement bar 10 to match the effective length of the bulkhead door suspension beam 2.

Referring simultaneously to FIGS. 2 and 3, carriage "keepers" 26 are fixedly welded to the lower surfaces of the horizontal flanges 12 of the left and right angle irons 6 and 8, such keepers 26 being positioned so that they extend beneath overhead roller tracks 36 while flanged wheels 14 are rollably mounted upon the upper surfaces of overhead roller tracks 36. The keepers 26 keep the carriage from bouncing upwardly off of the overhead roller tracks during movement of the railcar.

In operation of the present inventive carriage, referring to FIG. 3, the carriage is positioned so that the rolling surfaces of its flanged wheels 14 are in rolling contact with the upper surfaces of overhead roller tracks 36 of the railcar. Such overhead roller tracks 36 commonly have a multiplicity of cogwheel apertures 37 therethrough for utilization with carriages having cogwheels. The flanged wheels 14 are capable of smoothly rolling over such cogwheel apertures 37 as though the overhead roller tracks 36 were imperforate.

Upon such rollable mounting of the carriage, a bulkhead door 50 is suspended from the bulkhead door suspension beam 2, preferably by means of suspension plates 42 which typically are welded in place. A lading-engaging panel 46 is similarly suspended from the lading-engaging panel suspension beam 4 by means of device joints 60 which engage with eye plates 24, and by means of shear pins 44 which interlock the eye plates 24 and the device joints 60. Pivot arms 52 having a pivoting forward ends and slidably pivoting rearward ends interconnect the bulkhead door 50 and the lading-engaging panel 46. The bulkhead door 50 and the lading-engaging panel 46 are further interconnected by an air bladder 48 which, through injection of pressurized air through an air pressure line 54, causes the lading-engaging panel 46 to move away from the bulkhead door 50. The bulkhead door 50 may be selectively locked in place at any position along the length of a railcar by means of upper lock pins 58 and lower lock pins 56 which, through manipulation of a lever (not shown in view), are respectively extended upwardly and downwardly through lock pin receiving apertures 40 within the overhead roller tracks 36 and within the lower lock pin plates 38.

Upon locking the bulkhead door 50 in its desired position within a railcar, cargo is loaded into the railcar on the side of the lading-engaging panel. An air compressor is utilized to inject pressurized air into an air bladder 48, causing the lading-engaging panel 46 to move away from the bulkhead door 50 and causing the lading-engaging panel 46 and the lading-engaging panel suspension beam 4 to rollably moving with respect to the bulkhead door 50 along the roller tracks 12 of the left and right angle irons 6 and 8. Such motion of the lading-engaging panel exerts pressure upon the cargo, stabilizing the cargo, and preventing the cargo from shifting during transport.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A carriage for rollable suspension of a bulkhead door from a pair of overhead roller tracks, the bulkhead door having a lading-engaging panel extendably and retractably attached thereto, the carriage comprising:

(a) a bulkhead door suspension beam having a lateral side surface;

(b) a lading-engaging panel suspension beam having a lateral side surface, the bulkhead door suspension beam and the lading-engaging panel suspension beam being positioned so that their lateral side surfaces face each other;

(c) first rollable mounting means spanning laterally between and interconnecting the bulkhead door suspension beam and the lading-engaging panel suspension beam whereby the lading-engaging panel suspension beam is alternately extendable from and retractable toward the bulkhead door suspension beam; and, (d) second rollable mounting means fixedly attached to the bulkhead door suspension beam, the second rollable mounting means allowing, upon placement of the second rollable mounting means in rolling contact with the pair of overhead roller tracks, rolling motion, in unison, of the bulkhead door suspension beam, the lading-engaging panel suspension beam, and the first rollable mounting means.

2. The carriage of claim 1 wherein the first rollable mounting means comprises a first pair of wheels rotatably mounted upon opposing ends of the lading-engaging panel suspension beam.

3. The carriage of claim 2 wherein the first rollable mounting means further comprises a second pair of roller tracks fixedly attached to and extending substantially perpendicularly from opposing ends of the bulkhead door suspension beam, the first pair of wheels being in rolling contact with the second pair of roller tracks.

4. The carriage of claim 3 wherein the second rollable mounting means comprises a left pair of wheels and a right pair of wheels, the left and right pairs of wheels being rotatably mounted upon the carriage, and being positioned at opposing ends of the bulkhead door suspension beam.

5. The carriage of claim 4 wherein each roller track among the second pair of roller tracks has a flange extending substantially perpendicularly therefrom, each of the flanges having an outside surface, the right and left pairs of wheels being further positioned so that they extend outwardly from the outside surfaces of the flanges.

6. The carriage of claim 5 wherein each roller track among the second pair of roller tracks and each of the flanges has an end extending from the lateral surface of the bulkhead door suspension beam, and further comprising a reinforcement bar spanning between and interconnecting said flange ends.

7. The carriage of claim 6 wherein each wheel among the first pair, left pair, and right pair of wheels has an annular roller track engaging flange.

8. A carriage for rollable suspension of a bulkhead door from a pair of overhead roller tracks, the bulkhead door having a lading-engaging panel extendably and retractably attached thereto, the carriage comprising:

(a) a bulkhead door suspension beam having a length;

(b) a lading-engaging panel suspension beam having a length;

(c) first rollable mounting means interconnecting the bulkhead door suspension beam and the lading-engaging panel suspension beam whereby the lading-engaging panel suspension beam is alternately extendable from and retractable toward the bulkhead door suspension beam;

(d) second rollable mounting means fixedly attached to the bulkhead door suspension beam, the second rollable mounting means allowing, upon placement of the second rollable mounting means in rolling contact with the pair of overhead roller tracks, rolling motion, in unison, of the bulkhead door suspension beam, the lading-engaging panel suspension beam, and the first rollable mounting means;

(e) means for adjustment of the length of the bulkhead door suspension beam, such adjustment means being attached to the bulkhead door suspension beam; and, (f) means for adjustment of the length of the lading-engaging panel suspension beam, such lading-engaging panel suspension beam adjustment means being fixedly attached to the lading-engaging panel suspension beam.

9. The carriage of claim 8 wherein the bulkhead door suspension beam has a longitudinally extending channel, wherein the lading-engaging panel suspension beam has a longitudinally extending channel, and wherein the means for adjustment of the lengths of the bulkhead door suspension beam and the lading-engaging panel suspension beam comprise a plurality of extension arms mounted within said channels.

10. The carriage of claim 9 wherein the first rollable mounting means comprises a first pair of wheels rotatably mounted upon opposing ends of the lading-engaging panel suspension beam.

11. The carriage of claim 10 wherein the first rollable mounting means further comprises a second pair of roller tracks fixedly attached to and extending substantially perpendicularly from opposing ends of the bulkhead door suspension beam, the first pair of wheels being in rolling contact with the second pair of roller tracks.

12. The carriage of claim 11 wherein the second rollable mounting means comprises a left pair of wheels and a right pair of wheels, the left and right pairs of wheels being rotatably mounted upon the carriage, and positioned at opposing ends of the bulkhead door suspension beam.

13. The carriage of claim 12 wherein each roller track among the second pair of roller tracks has a flange extending substantially perpendicularly therefrom, each of the flanges having an outside surface, the right and left pairs of wheels being further positioned so that they extend outwardly from the outside surfaces of the flanges.

14. The carriage of claim 13 wherein the bulkhead door suspension beam has a lateral surface facing the lading-engaging panel suspension beam, wherein each roller track among the second pair of roller tracks and each of the flanges has an end extending from the lateral surface, and further comprising a reinforcement bar having a length, the reinforcement bar spanning between and interconnecting said flange ends.

15. The carriage of claim 14 further comprising reinforcement bar length adjusting means fixedly attached to the reinforcement bar.

16. The carriage of claim 15 wherein each wheel among the first pair, left pair, and right pair of wheels has an annular roller track engaging flange.

17. A carriage for rollable suspension of a bulkhead door from a pair of overhead roller tracks, the bulkhead door having a lading-engaging panel extendably and retractably attached thereto, the carriage comprising:

(a) a bulkhead door suspension beam;

(b) a lading-engaging panel suspension beam;

(c) first rollable mounting means interconnecting the bulkhead door suspension beam and the lading-engaging panel suspension beam whereby the lading-engaging panel suspension beam is alternately extendable from and retractable toward the bulkhead door suspension beam; and, (d) second rollable mounting means fixedly attached to the bulkhead door suspension beam, the second rollable mounting means allowing, upon placement of the second rollable mounting means in rolling contact with the pair of overhead roller tracks, rolling motion, in unison, of the bulkhead door suspension beam, the lading-engaging panel suspension beam, and the first rollable mounting means; the first rollable mounting means comprising a first pair of wheels rotatably mounted upon opposing ends of the lading-engaging panel suspension beam; the first rollable mounting means further comprising a second pair of roller tracks fixedly attached to and extending substantially perpendicularly from opposing ends of the bulkhead door suspension beam, the first pair of wheels being in rolling contact with the second pair of roller tracks.

18. The carriage of claim 17 wherein the second rollable mounting means comprises a left pair of wheels and a right pair of wheels, the left and right pairs of wheels being rotatably mounted upon the carriage, and being positioned at opposing ends of the bulkhead door suspension beam.

19. The carriage of claim 18 wherein each roller track among the second pair of roller tracks has a flange extending substantially perpendicularly therefrom, each of the flanges having an outside surface, the right and left pairs of wheels being further positioned so that they extend outwardly from the outside surfaces of the flanges.

20. The carriage of claim 19 wherein the bulkhead door suspension beam has a lateral surface facing the lading-engaging panel suspension beam, wherein each roller track among the second pair of roller tracks and each of the flanges has an end extending from the lateral surface, and further comprising a reinforcement bar spanning between and interconnecting said flange ends.

21. The carriage of claim 20 wherein each wheel among the first pair, left pair, and right pair of wheels has an annular roller track engaging flange.

* * * * *